United States Patent

Shuck et al.

[11] 4,045,724
[45] Aug. 30, 1977

[54] ELECTROMAGNETIC WAVE METHOD FOR MAPPING SUBTERRANEAN EARTH FORMATIONS

[75] Inventors: Lowell Z. Shuck; George E. Fasching; Constantine A. Balanis, all of Morgantown, W. Va.

[73] Assignee: The United States of America as represented by the United States Energy Research and Development Administration, Washington, D.C.

[21] Appl. No.: 674,209

[22] Filed: Apr. 6, 1976

[51] Int. Cl.$^2$ ............................ G01V 3/12; G01V 3/18
[52] U.S. Cl. ...................................................... 324/6
[58] Field of Search ................................ 324/6, 1, 5, 7

[56] References Cited

U.S. PATENT DOCUMENTS

| | | | |
|---|---|---|---|
| 2,455,941 | 12/1948 | Muskat et al. | 324/6 |
| 3,114,875 | 12/1963 | Haagensen | 324/1 |
| 3,286,163 | 11/1966 | Holser et al. | 324/6 |
| 3,412,322 | 11/1968 | Unterberger | 324/6 |
| 3,412,815 | 11/1968 | Holser et al. | 324/6 X |

Primary Examiner—Gerard R. Strecker
Attorney, Agent, or Firm—Dean E. Carlson; Stephen D. Hamel; Earl L. Larcher

[57] ABSTRACT

The present invention is directed to a method for remotely mapping subterranean coal beds prior to and during in situ gasification operations. This method is achieved by emplacing highly directional electromagnetic wave transmitters and receivers in bore holes penetrating the coal beds and then mapping the anomalies surrounding each bore hole by selectively rotating and vertically displacing the directional transmitter in a transmitting mode within the bore hole, and thereafter, initiating the gasification of the coal at bore holes separate from those containing the transmitters and receivers and then utilizing the latter for monitoring the burn front as it progresses toward the transmitters and receivers.

2 Claims, 1 Drawing Figure

U.S. Patent    Aug. 30, 1977    4,045,724
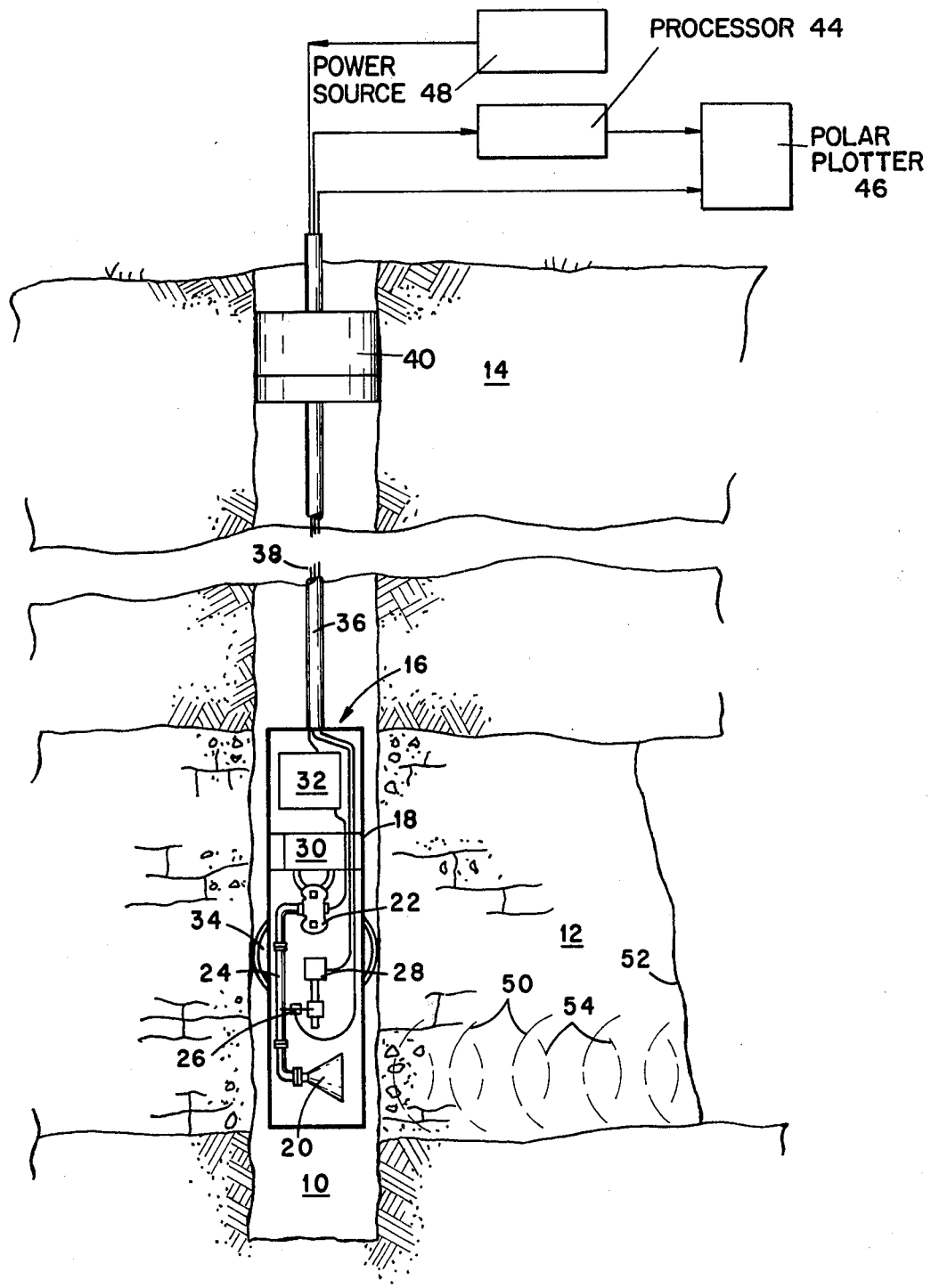

ELECTROMAGNETIC WAVE METHOD FOR MAPPING SUBTERRANEAN EARTH FORMATIONS

The present invention relates generally to mapping subsurface earth formations, and more particularly to the mapping and monitoring of sub-surface coal beds prior to and during coal gasification operations by employing an electromagnetic scanning system.

The production of low and high Btu gas by in situ gasification of coal in subterranean coal beds is expected to play a major role in supplying the energy demands of the world. Briefly, in situ gasification of subterranean coal beds may be achieved by penetrating the coal bed with a plurality of vertical bore holes disposed in a plane orthogonal to the plane of maximum permeability in the coal bed. A second plurality of bore holes may then be placed in the coal bed at a location spaced from and parallel to the first plurality of bore holes. The gasification operation is then initiated in the first set of bore holes to establish a burn front which progresses toward the second set of bore holes while the resulting product gas is removed from either the first or second set of bore holes by directing combustion supporting gas either through the second set of bore holes or through the first set of bore holes. It is important for efficient in situ gasification operations to assure that a maximum quantity of the coal within the coal bed is gasified. One of the conditions necessary to provide an efficient operation is that the burn front uniformly progresses across the space between the bore holes so as to gasify virtually all the coal lying therebetween. There are several factors which affect the propagation of the burn front so as to render difficult the establishment and maintenance of a uniformly propagating burn front. For example, the presence of water channels, natural factures, and other anomalies in the coal bed will affect the burn front so as to cause a nonuniform progression thereof. Further, the permeability of the coal at some locations may be less than that at an adjacent location so as to effect a more rapid progression of the burn front in the more permeable location. Selectively controlling both the withdrawal of the product gas and the addition of the combustion supporting gas at certain bore holes is believed to provide a satisfactory technique for controlling the progression of the burn front. However, there is no satisfactory technique at the present time for indicating the exact location and configuration of the burn front as it progresses between the bore holes. Thus, in order to provide an efficient gasification operation, it is desirable to first provide a method for determining and mapping anomalies, such as the water channel, fractures, and other conditions, such as geological faults or strata nonuniformities that exist in the coal bed prior to gasification and, secondly, determine the location, configuration and the rate of burn as the burn front progresses through the coal bed.

Accordingly, it is the general objective of the present invention to provide a method of assessing properties and characteristics of coal beds prior to initiating in situ gasification operations and thereafter monitoring the propagation of burn front to provide information relating to the location, uniformity, and rate of burn of the burn front as it proceeds through the coal bed. This objective is achieved by first mapping the anomalies within the coal bed by emplacing an electromagnetic scanning system incorporating a highly directional transmitting antenna in each of a plurality of strategically located bore holes penetrating a coal bed. The coal bed is then scanned at several different frequencies in a 360° azimuth direction at various vertical locations within the holes to map the anomalies within the coal bed prior to initiating the coal gasification operation. After the in situ gasification is initiated, the electromagnetic scanning systems are utilized for monitoring the characteristics of the burn front as it propagates through the coal bed to assure the most efficient operation. This monitoring is provided by directing the antenna in a selected azimuthal angular sector at various vertical positions to provide an accurate description of the progressing burn front.

Other and further objects of the invention will be obvious upon an understanding of the illustrative method about to be described, or will be indicated in the appended claims and various advantages not referred to herein will occur to one skilled in the art upon employment of the invention in practice.

An embodiment has been chosen for the purpose of describing the method of the present invention. The embodiment illustrated is not intended to be exhaustive or to limit the invention to the practice of the subject method or the embodiment shown. It is chosen and described in order to best explain the principles of the invention and their application in practical use to thereby enable others skilled in the art to best utilize the invention in various modifications of the method as are best adapted to the particular use contempated.

In the accompanying drawing:

The FIGURE is a higly schematic illustration showing an electromagnetic scanning system incorporating a highly directional transmitting antenna disposed in a bore hole penetrating a coal bed. The system depicted is illustrative of the type of scanning which may be utilized in that while the scanning system shown employs a horn-type antenna, it will appear clear that other configurations of transmitters may be utilized, such as dipoles with parabolic reflectors or corner reflectors.

Described generally, the present invention is directed to a method for electromagnetically monitoring subsurface coal beds prior to and during in situ gasification operations for the production of low and/or high Btu gas. The electromagnetic monitoring is accomplished by penetrating the coal bed with one or a plurality of strategically placed bore holes, inserting an electromagnetic scanning system incorporating a highly directional transmitting antenna into the one or any selected number of the plurality of bore holes and thereafter scanning the coal media in a horizontal direction at any selected azimuthal angular sector up to 360°, with a rotating antenna, transmitting the electromagnetic wave at different frequencies at each horizontal level while continuously measuring the reflected radio frequency (RF) waves by means of a voltage standing wave ratio meter (VSWR) that is installed in an appropriate location in the system. Any orthogonally disposed interface in the coal media within the sensitive range of the scanning system where a deviation in the permittivity, permeability and/or conductivity exists will reflect radio frequency energy back into the antenna which can be detected by the VSWR.

A deviation in these electrical properties occurs at such anaomalies as provided by a solid-gas interface, e.g., an open fracture in the coal bed, a solid-liquid interface or a liquid-gas interface. The latter two interface conditions may result from the presenece of water (pure and saline) channels and liquid (waters, tars, etc.)

migration and redistribution associated with reaction dynamics. The RF energy is also reflected at the junction of two electrically different solid materials, such as coal and char provided at the leading edge or burn front of the gasification zone. As the antenna is rotated, reflected RF power varies with the property or condition of the media in the range to the reflecting layers encountered. Since the major reflected power is a composite of many reflected components dispersed within the effective beam of the antenna, a relatively narrow beam width is necessary for providing good angular resolution and for confining the measurement vertically.

The higher frequencies with the shorter wave lengths (greater than 30 MHz) provide better dimensional resolution than using lower frequencies even though the attenuation of the higher frequencies is greater in a relatively high lossy material, such as coal.

The scanning takes place in a horizontal direction about the entire circumference of the bore holes to provide a description of the anomalies present about the bore holes within the effective transmission and reflection length of the transmitter and receiver. Also, the well bore is horizontally scanned at various vertical locations by raising or lowering the scanning system within the coal bed to provide a more accurate description of the coal bed.

In order to plot or map the anomalies in the coal bed with sufficient detail and accuracy, measurements are preferably made with different frequencies in selected well bores of an array of strategically placed bore holes in the coal bed. At each scanning location a polar plot at each frequency is made of the magnitude of the reflected power, the ratio of reflected power to incidence power, and the dielectric constant and tangent loss are correlated with each other and with information available from other bore holes in the array to describe the anomalies and delineate the boundaries of the coal beds as well as the boundaries and characteristics of the burn front during the gasification operation.

The angular resolution of electromagnetic sensors is determined by the antenna bandwidth, which can be achieved only by employing antennas which are large relative to wavelength. However, because of the relatively large attenuation of electromagnetic energy in a highly lossy media, such as coal beds, especially at relatively high frequencies, a compromise must be made between resolution and range. The placement of the scanning system within the coal beds is somewhat limited by the available space, but it is expected that bore holes in the range of about 6–18 inches in diameter will be normally employed in gasification operations so as to enable the use of a sufficiently large antenna to provide the desired mapping.

An important consideration of the wave propagation through the coal bed is that the electrical conductivity of the media above and below the coal bed are believed to be relatively large when compared to that of the coal bed. This condition is usually present in sub-surface coal beds since the conductivity of wet soil, such as clay and the like, which normally borders coal beds is usually about $10^3$ times greater than that of coal. The three-layer media as provided by the coal bed and the sub-surface earth formations above and below the coal bed will enable the coal bed to be utilized as a wave guide for the electromagnetic energy. With the coal bed functioning as a wave guide the scanning system of the present invention provides a substantially more accurate and detailed description of the sub-surface coal bed than if the coal bed did not function as a wave guide structure.

Inasmuch as the antennas are restricted in size due to the diameter of bore holes, the distances through the coal bed which may be satisfactorily monitored is in a range of about 20 to 50 feet at frequencies in the order of about 30 MHz to 10,000 MHz. This frequency range is believed to be sufficient to provide satisfactory descriptions of the coal bed and burn front. However, it will appear clear that since the attenuation of these high frequencies waves is substantial in the lossy coal bed, it may be desirable to use antenna systems wherein a frequency range less than the 30 MHz may be utilized for the coal bed mapping and burn front monitoring.

The method of the present invention may be practiced by using an electromagnetic scanning system, such as shown in the accompanying figure wherein a bore hole 10 is shown penetrating a coal bed 12 through an overlying sub-surface earth formation 14. The electromagnetic scanning system as generally shown at 16 comprises a radome 18 which houses the scanning system 16 and which may be constructed of a suitable plastic material, such as conventionally employed in the fabrication of radomes for use with airborne systems. Within the radome 18 there is shown a horn-type antenna 20 coupled to a magnetron 22 through a wave guide 24 containing the VSWR meter 26. The magnetron may be of any well-known type capable of oscillating at the frequencies applicable for use in the scanning method of the present invention. The VSWR meter 26 is coupled to the wave guide 24 by employing a slotted wave guide or a suitable directional coupler. The VSWR meter 26 may also be coupled to a traversing motor, such as shown at 28, for positioning the VSWR meter 26 if the wave guide 24 is of the slotted type. The radome 18 may also house a cooling system 30 for assuring efficient operation of the magnetron 22 and a high voltage and filament power supply 32 for the magnetron. The radome 18 may be spaced from and centered in the bore hole 10 by employing suitable stabilizing and centering bearings as shown at 34. The radome 18 housing the electromagnetic scanning system 16 may, in turn, be coupled to surface systems by a conduit 36 formed of a material of sufficient integrity so as to allow the rotation of the scanning system 16 in any selected azimuth direction as well as for allowing for the displacement of the scanning system 16 to any selected vertical position within the coal bed. The conduit 36 contains the electrical leads 38 which convey the signals to and from scanning systems to surface circuitry. The rotation of the scanning system may be provided by using any suitable rotating mechanism, such as a resolver and motor arrangement 40 containing locking jacks for maintaining the scanning system 16 in a desired azimuth orientation. The resolver and motor arrangement may also contain a drive (not shown) for vertically displacing the scanning system within the bore hole, but any suitable lifting system may be used to vertically orient the scanning system. The motor arrangement 40 may be disposed within the bore hole 10, as shown, or at any suitable location thereabove. The signals from the VSWR meter 26 are directed to a receiver or processor 44 which amplifies and filters the signal. The results from the processor 44 are then fed into a polar plotter 46 which also receives a signal indicative of the azimuth angle and vertical position of the scanning system. The polar plotter 46 functions to provide a plot indicative of the anomalies of the coal bed prior to and during the gasification operations. The electrical power for the operation of the scanning system and drives may be derived from a suitable power source shown at 48.

Typically, for providing a polar plot of the burn front in the coal bed surrounding the bore hole 10, the antenna 20 transmits a signal 50 of a desired frequency towards the burn front 52 which, in turn, reflects a signal 54 back to the receiver for reception by the VSWR 26 for transmission to the polar plotter 46. As the configuration and position of the burn front changes, the polar plotter is able to provide an accurate reading of these burn front characteristics so as to yield an accurate description of the in situ gasification operation to enable the latter to be accomplished in a highly efficient manner.

While the aforementioned description is directed to the application of the present invention in the mapping and monitoring of coal beds for in situ gasification purposes, it will appear clear that the method of the present invention may be used for other underground exploration, such as in oil shale, oil-containing sand formations, underground reservoir evaluation, and the detection of foreign objects, such as voids, gas and water pockets, and well casings buried inside unmined coal beds. The early warning provided by employing the scanning system of the present invention will allow mining machine operators to take measures to minimize fire and other hazards. Also, while the description is directed to vertically oriented bore holes, it will appear clear that the method of the prsesent invention is applicable in any directionally oriented bore hole which may be perpendicular, parallel, or at an angle between 0°-90° to the bedding plane of the coal bed or other sub-surface earth formation.

What is claimed is:

1. A method for mapping anomalies in a subterranean coal bed prior to in situ gasification of the coal bed and for providing the description of the continually changing characteristics and position of a burn front resulting during the in situ gasification of the coal bed, comprising the steps of emplacing a highly directional electromagnetic wave transmitting means and an electromagnetic wave receiving means including a voltage standing wave ratio meter in each of a plurality of vertical directionally oriented bores penetrating the coal bed, transmitting electromagnetic waves at a different selected frequency up to 10,000 MHz over a selected azimuth angle in each of said bores for effecting a reflection of the electromagnetic waves upon encountering an electrical anomaly indicative of at least one of a solid-gas interface indicative of the burn front, a solid-liquid interface, and a solid-solid interface where the electrical properties of the solids defined in the solid-solid interface differ, and providing a polar plot of the magnitude of the reflected waves and the ratio of the power of the reflected waves to the power of the incident waves at each selected frequency and correlating the dielectric constant of the coal bed and tangent loss at each transmitted frequency with each other for providing the mapping of the anomlies in the coal bed and the description and position of the burn front in the coal bed.

2. The method claimed in claim 1, including the additional step of moving the transmitting and receiving means into selected locations within each of said bores, and wherein the mapping of the anomalies is provided at each selected location in each bore by repeating the transmission of the electromagnetic waves and the polar plotting of the reflected electromagnetic waves at each vertical position.

* * * * *